United States Patent
Konter et al.

(10) Patent No.: US 7,632,362 B2
(45) Date of Patent: Dec. 15, 2009

(54) PROPERTY RECOVERING METHOD

(75) Inventors: Maxim Konter, Klingnau (CH); Robert Baumann, Klingnau (CH); John Fernihough, Ennetbaden (CH)

(73) Assignee: Alstom Technology Ltd, Baden (CH)

( * ) Notice: Subject to any disclaimer, the term of this patent is extended or adjusted under 35 U.S.C. 154(b) by 437 days.

(21) Appl. No.: 11/079,772

(22) Filed: Mar. 15, 2005

(65) Prior Publication Data

US 2005/0205174 A1 Sep. 22, 2005

(51) Int. Cl.
*C22F 1/10* (2006.01)
(52) U.S. Cl. ........................ 148/562; 148/675
(58) Field of Classification Search ................ 148/675, 148/562, 679
See application file for complete search history.

(56) References Cited

U.S. PATENT DOCUMENTS

| 2,336,297 | A | * | 12/1943 | Rooke | 285/288.1 |
| 4,643,782 | A | | 2/1987 | Harris et al. | |
| 4,753,686 | A | | 6/1988 | Company et al. | |
| 4,900,394 | A | * | 2/1990 | Mankins | 117/10 |
| 5,759,301 | A | | 6/1998 | Konter et al. | |
| 5,820,700 | A | * | 10/1998 | DeLuca et al. | 148/410 |
| 5,882,446 | A | | 3/1999 | Konter | |
| 6,629,368 | B2 | * | 10/2003 | Schnell et al. | 29/889.1 |

FOREIGN PATENT DOCUMENTS

EP  0 937 784 A1  8/1999

OTHER PUBLICATIONS

D.L. Sponseller, Superalloys, "Differential Thermal Analysis of Nickel-Base Superalloys", 1996, p. 259.*

* cited by examiner

*Primary Examiner*—Roy King
*Assistant Examiner*—Jessee R. Roe
(74) *Attorney, Agent, or Firm*—Buchanan Ingersoll & Rooney PC

(57) ABSTRACT

A method is disclosed for recovering the properties of single crystal and directionally solidified Nickel based superalloys and articles made thereof, after use in a high temperature environment. The method comprises the steps of a stress relief treatment, a γ' rejuvenation heat treatment at a temperature below the γ'-solvus temperature ($T_{solvus, \gamma'}$) of the superalloy, a precipitation heat treatment and an aging heat treatment.

13 Claims, 4 Drawing Sheets

US 7,632,362 B2

PROPERTY RECOVERING METHOD

TECHNICAL FIELD

The present invention relates to a method for recovering the properties of single crystal and directionally solidified (columnar grained) articles manufactured from Nickel based superalloy, after the articles are used in a high temperature environment.

STATE OF THE ART

The wide use of single crystal (SX) and directionally solidified (DS) components allows an increased turbine inlet temperature and therefore an increased turbine efficiency as well. Alloys specially designed for SX/DS casting were developed in order to make maximum use of material strength and temperature capability. During operation of such components under high temperature conditions, various types of damage can occur. For example, cracks can result from thermal cycling or from foreign object impact. Because the cost of the precision cast components is relatively high, it is more desirable to repair these components than to replace them with new ones.

The γ/γ'-microstructure of a new single crystal (SX) component after the manufacture and after the component has been in use can be seen in the FIG. 4. The microstructure degrades and forms a rafted structure. Degradation of the structure occurs also in conventionally cast components, though morphology of degraded γ'-phase is in this case rather globular. In both cases structure degradation results in reduction in alloy strength. In the case of single crystal material a pronounced degradation, such as reversed γ/γ' (with γ' phase, with the volume fraction of 60-75% becoming a matrix) strength penalty is even more pronounced accompanied by an additional reduction in ductility.

The well established recovery procedure for superalloys consists of a solutioning heat treatment with fully or partially to a high degree (at least 50%) dissolves degraded γ' phase and than newly precipitate it in fine form during solutioning, cooling, precipitation heat treatment and aging.

EP-A1-0 937 784 proposes a property recovering method for a nickel-based heat resistant alloy. The recovering method consists of a two step solution treatment at different temperatures followed by an aging treatment.

U.S. Pat. No. 4,753,686 proposes a method of regenerating a machine part of cast nickel-based alloy comprising a hardening phase γ' at the end of its useful operational life as a result of creep damage. The method comprises the step of holding said machine part at a temperature for a period of time sufficient to redissolve at least 50% of the volumetric fraction of the hardening phase γ'.

These methods are effective for restoring properties in conventionally cast materials. However, if they were applied to single crystal articles which had been exposed to high temperatures and stresses during operation (i.e. first stage blades) they would lead to recrystallisation of the material during the highest temperature portion of the heat treatment.

SUMMARY OF INVENTION

The objective of the present invention is to find a regenerative heat treatment for a single crystal or directionally solidified article after use in a high temperature. environment for rejuvenation of the γ/γ' micro-structure which avoids recrystallisation and recovers original microstructure and mechanical properties as far as possible.

According the present invention a method was found for recovering the properties of single crystal and directionally solidified articles made from a Nickel based superalloy after the articles were used in a high temperature environment, wherein the method comprising the steps of (a) a stress relief treatment at 850° C.-1100° C., (b) a γ' rejuvenation treatment at a temperature between 20° C. and 80° C. below γ'-solvus temperature ($T_{solvus, \gamma'}$) of the Nickel based superalloy, (c) a precipitation treatment at 1050° C.-1150° C. and (d) an aging heat treatment at 800°-980° C.

A heat treatment is applied to an article made from an alloy which is essentially composed of (wt.-%) 9.3-10% Co, 6.4-6.8% Cr, 0.5-0.7% Mo, 6.2-6.6% W, 6.3-6.7% Ta, 5.45-5.75% Al, 0.8-1.2% Ti, 0-0.3% Hf, 2.8-3.2% Re, rest nickel and unavoidable impurities the relief treatment is then carried out at a temperature of about 950° C. for 1 to 4 hours and at about 1050° for 2 to 20 hours and the γ' rejuvenation treatment is carried out at a temperature between 1220° C. and 1270° C. To avoid any recrystallization the rejuvenation temperature could be lowered to a temperature between 1220° C. and 1250° C. for 2 to 12 hours.

The γ' solvus temperature ($T_{solvus, \gamma'}$) can be determined by performing Differential Thermal Analysis (DTA) measurements on the service-exposed and degraded alloy and observing the temperature of the onset of γ' solutioning and the γ' solvus temperature $T_{solvus, \gamma'}$.

In another embodiment of the present invention recrystallized areas are detected after the γ' rejuvenation heat treatment and the recrystallized material is replaced by welding or insert brazing. With advantage, the replacement material is welded epitaxially with base material. A replacement coupon material to be brazed is advantageous of a single crystal or directionally solidified structure similar to the base material. Again, then brazing solidifies epitaxially with the coupon and base material.

SHORT SUMMARY OF DRAWINGS

The invention is illustrated by the accompanying drawings, in which

Figure 3:
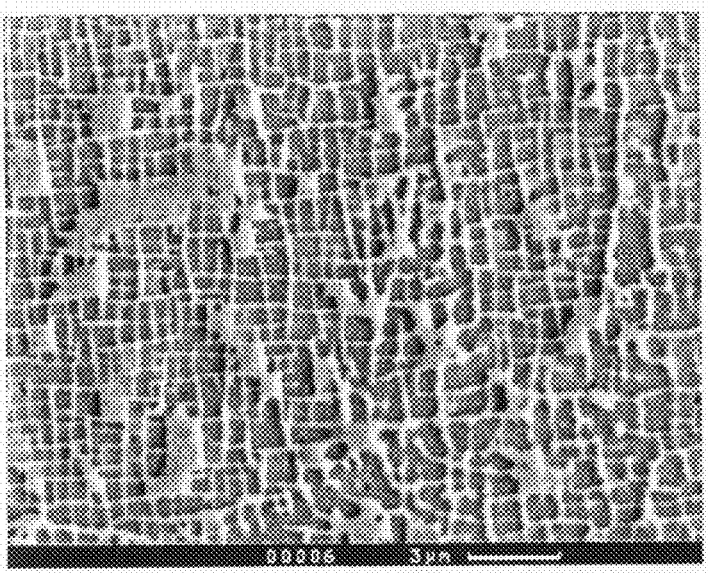
Figure 4:
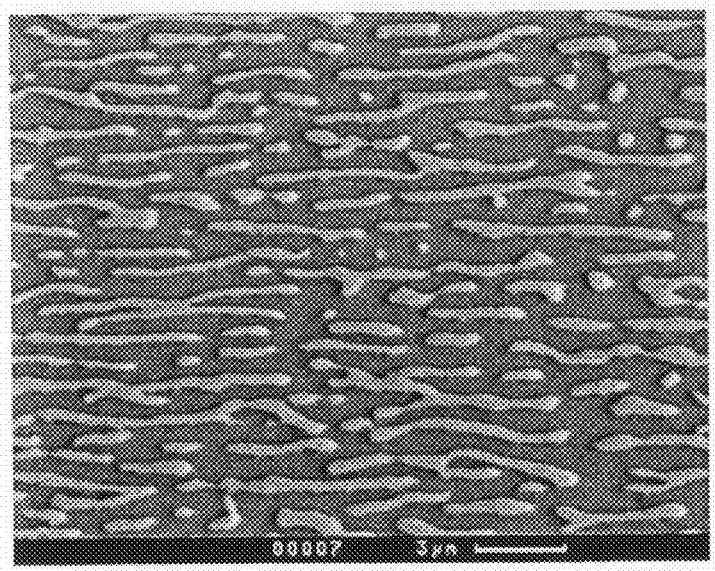
Figure 5:
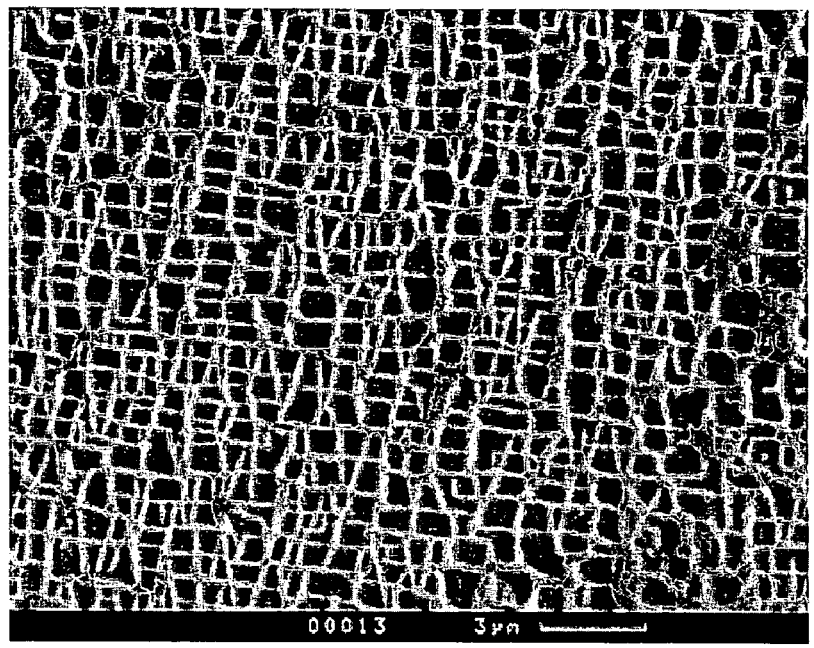
Figure 6:
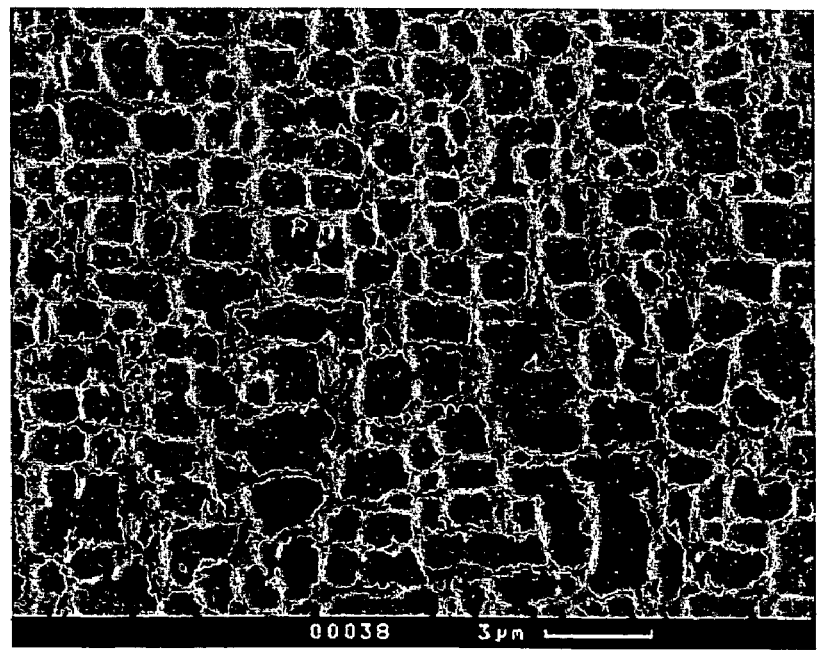
Figure 7:
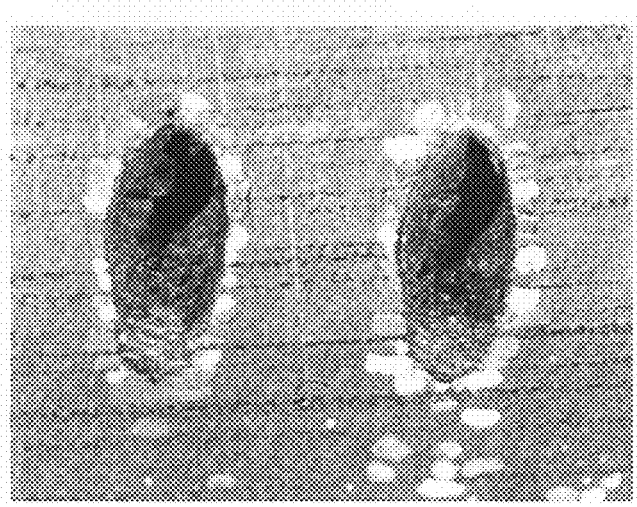
Figure 8:
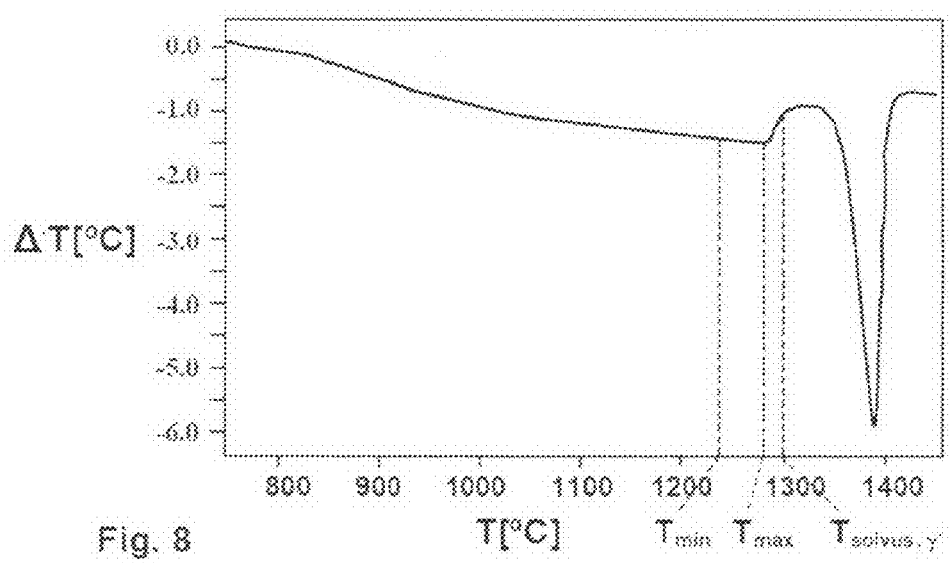

FIG. 3 shows a reference example for a γ/γ'-structure after the manufacture of the component, FIG. 4 shows a degraded and rafted structure after the component has been in use, FIG. 5 shows a γ/γ'-structure where solutioning and recrystallisation took place, the γ'-solutioning treatment took place at a temperature of 1280° C. for 5 hours, FIG. 6 shows γ/γ'-structure reconditioned according to the present invention, the γ'-rejuvenation treatment took place at a temperature of 1250° C. for 5 hours FIG. 7 shows a cooling holes with recrystallisation took place, the γ'-solutioning treatment took place at a temperature of 1290° C. for 2 hours and FIG. 8 shows schematic view of a Differential Thermal Analysis (DTA) of the used Nickel base superalloy.

The drawings show only parts important for the invention.

PREFERRED EMBODIMENT OF THE INVENTION

Figure 1:
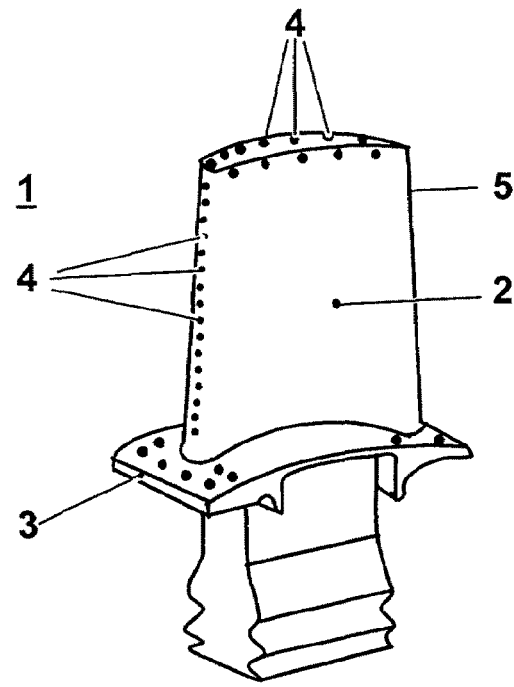
FIG. 1 shows a turbine blade an example.

The present invention is generally applicable to components that operate within environments characterised by relatively high temperature, and are therefore subjected to severe thermal stresses and thermal cycling. Notable examples of such components include the high and low pressure vanes and blades, shrouds, combustor liners and augmentor hardware of gas turbine engines. FIG. 1 shows an example of such an article 1, in this case a blade 2 against which hot combustion gases are directed during operation of the gas turbine engine, a cavity, not visible in FIG. 1, and cooling holes 4, which are on the airfoil 5 of the blade 1 as well as on the platform 3 of the blade. Cooling air is ducted during operation of the engine through the cooling holes 4 in order to cool the surrounding material in the airfoil 5 and platform 3. The external surface of the airfoil 5 is subjected to severe attack by oxidation, corrosion and erosion due to the hot combustion gases. In many cases the article 1 consists of a nickel or cobalt base super alloy such as disclosed, by way of an example, in U.S. Pat. No. 5,759,301. In principle, the article 1 can be single crystal (SX) or directionally solidified (DS). While this invention has been described with reference to a turbine blade or vane as shown in FIG. 1, the same advantages will be maintained if the method is applied to any article made out of a gamma-prime strengthened Ni based superalloy that is manufactured to be a single crystal (SX) or directionally solidified (DS) (columnar grained) article.

FIG. 3 shows a γ/γ'-microstructure of such a new component after manufacture, whereas FIG. 4 shows an example of a degraded and rafted microstructure after the component has been in use. In the present invention it was the aim to find a regenerative heat treatment for a single crystal (SX) and directionally solidified (DS) component after use in a high temperature environment for rejuvenation of the γ/γ'-microstructure which avoids recrystallisation and recovers original microstructure and mechanical properties compared to the degraded condition. For this, an examination of resulting microstructure focused was on following principle points: resulting hardness, occurring of recrystallisation and rejuvenation of γ/γ'-micro-structure dependent on a rejuvenation treatment in a predetermined temperature range.

The test described herein were performed with a nickel based superalloy which is essentially composed of (wt.-%) 9.3-10% Co, 6.4-6.8% Cr, 0.5-0.7% Mo, 6.2-6.6% W, 6.3-6.7% Ta, 5.45-5.75% Al, 0.8-1.2% Ti, 0-0.3% Hf, 2.8-3.2% Re, rest nickel and unavoidable impurities. U.S. Pat. No. 4,643,782 discloses the superalloy under the name CMSX-4.

Figure 2:
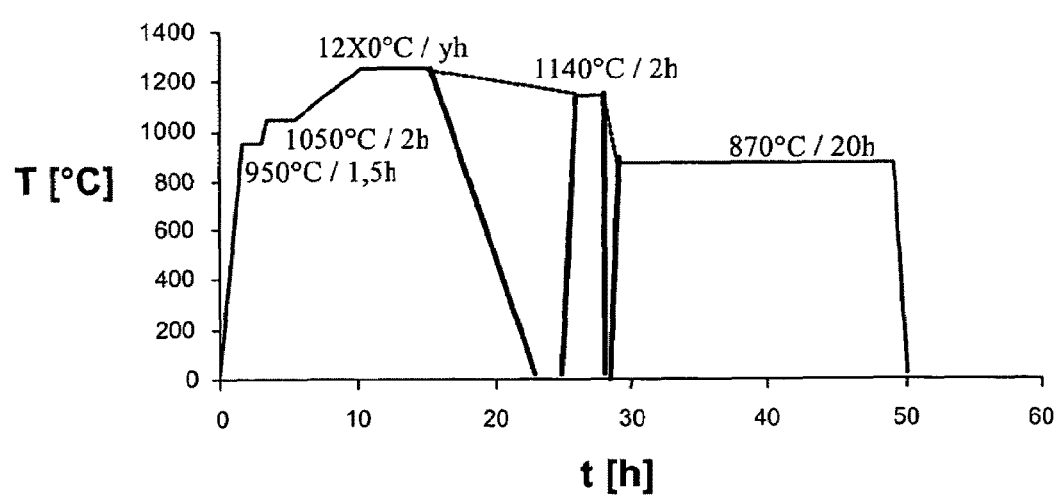
FIG. 2 shows a heat treatment cycle for the tests carried out.

The regenerative heat treatment applied to the test pieces is shown in FIG. 2 and Tab. 1. Between the rejuvenation or solutioning treatment and the aging 1 and the aging 2 treatment the test piece can cooled down to room temperature. In general, a precipitation treatment at a temperature range of 1050° C.-1150° C. and an aging heat treatment at a temperature range of 800°-980° C. as known from the prior art can be applied.

446, every sample is stress relieved for 1,5 h at 950° C. and for 2 h at 1050° C. before the main rejuvenation or solution heat treatment, some of the specimens have been subjected to an aging-treatment at 1140° C. for 2 h.

A blade as shown in FIG. 4 in the after service condition with a rafted structure has been used for further investigations. Before the rejuvenation heat treatment it has been stripped of any residual coating on the outer surface. After the different heat treatment cycles, the blades were first checked for the occurring of recrystallisation through grain boundary etching, afterwards they were cut up, cold embedded and polished for Vickers hardness testing (p=0,5 kg) and microstructure investigation on SEM at different locations.

As a first step, one blade was subjected to a whole rejuvenation heat treatment with solutioning at 1270° C. for 2 h. After analysis, further blades were treated at 1290° C., 1280° C., 1270° C. and 1250° C. for different time periods.

The test cycles show that γ/γ'-microstructure can partly be recovered by exposing by heat history deteriorated SX CMSX-4 to thermal heat treatment consisting of stress relief-, rejuvenation- and ageing-stages, where a γ' rejuvenation treatment at a temperature below γ'-solvus temperature ($T_{solvus, \gamma'}$) of the Nickel based superalloy is applied.

As shown in FIG. 6, the heat treatments at 1250° C. for 5 hours did not lead to recrystallization. The investigated Hardness was 418 HV. In contradiction FIG. 5, where a γ'-solutioning treatment at a temperature of 1280° C. for 5 hours was applied, shows a γ/γ'-structure with partial solutioning and recrystallisation. Furthermore FIG. 7, where a γ'-solutioning treatment at a temperature of 1290° C. for 2 hours was applied, a γ/γ'-structure with higher degree of both solutioning and recrystallisation is shown. Results are shown in Tab. 2

TABLE 2

| Sample | Rejuvenation temperature [° C.] | Time [h] | Vickers hardness (HV) |
|---|---|---|---|
| FIG. 3, (reference) | — | — | 450 |
| FIG. 4, (degraded) | — | — | 390 |
| FIG. 5 | 1280 | 5 | 420 |
| FIG. 6 | 1250 | 5 | 418 |
| FIG. 7 | 1290 | 2 | |

TABLE 1

| Step | Component Temperature [° C.] | Hold Time [h] | Atmosphere | Ramp condition | Cooling condition |
|---|---|---|---|---|---|
| Stress relief 1 | 950 | 1.5 | vacuum | 10° C./min. | — |
| Stress relief 2 | 1050 | 2 | vacuum | 5° C./min. | — |
| Rejuvenation/ Solutioning | 12x0 | y | vacuum | 0.5° C./min. | argon with fan |
| Aging 1 | 1140 | 2 | vacuum | — | argon with fan |
| Aging 2 | 870 | 20 | vacuum | — | argon with fan |

As seen in FIG. 8 the temperature window between a minimum temperature $T_{min}$ and a maximum temperature $T_{max}$ in which the heat treatments were performed, was determined by Differential Thermal Analysis (DTA). A window of about 70° C., for this specific example namely between 1220° C. and 1290° C. was estimated, in addition different cooling rates are taken into account. According to U.S. Pat. No. 5,882, According to the present invention the γ' rejuvenation treatment should be at a temperature between 20° C. and 80° C. below γ'-solvus temperature $T_{solvus, \gamma'}$ of the used Nickel based superalloy, providing no or only insignificant degree of γ'-dissolution. For the alloy used in the present investigation this is at a temperature range between 1220° C. and 1270° C. The treatment should last between 2 to 12 hours.

To avoid risk of recrystallization of areas heavily deformed by foreign object damage during the service of during an inappropriate handling afterwards, the solutioning temperature could be lowered to a temperature between 1220° C. and 1250° C. for 2 to 12 hours.

The γ' solvus temperature ($T_{solvus, \gamma'}$) can be determined by performing Differential Thermal Analysis (DTA) measurements on the service-exposed and degraded alloy and observing the temperature of the onset of γ' solutioning and the γ' solvus temperature $T_{solvus, \gamma'}$.

In another embodiment of the present invention recrystallized areas are detected after the γ' rejuvenation heat treatment and the recrystallized material is replaced by welding or insert brazing. With advantage, the replacement material is welded epitaxially with base material. A replacement coupon material to be brazed is advantageous of a single crystal or directionally solidified structure similar to the base material. Again, then brazing solidifies epitaxially with the coupon and base material.

| REFERENCE LIST | |
| --- | --- |
| 1 | Article |
| 2 | Blade |
| 3 | Platform |
| 4 | Cooling holes |
| 5 | External surface of article 1 |
| t | time |
| T | temperature |
| $T_{min}$ | min. temperature for the γ' rejuvenation treatment |
| $T_{max.}$ | max. temperature for the γ' rejuvenation treatment |
| $T_{solvus, \gamma'}$ | γ' solvus temperature of superalloy |

The invention claimed is:

1. A property recovering method for single crystal and directionally solidified material bodies made from a Nickel based superalloy with a degraded and rafted microstructure comprising the steps of
   (a) a stress relief treatment at 850° C.-1100° C.,
   (b) a γ' rejuvenation treatment at a temperature of 20° C. to 80° C. below γ'-solvus temperature of the Nickel based superalloy,
   (c) a precipitation treatment at 1050° C.-1150° C. and
   (d) an aging heat treatment at 800° C.-980° C.

2. The method according to claim 1, wherein the stress relief heat treatment is applied to an article made at least in part with a material which is essentially composed of, in weight percent, 9.3-10% Co, 6.4-6.8% Cr, 0.5-0.7% Mo, 6.2-6.6% W, 6.3-6.7% Ta, 5.45-5.75% Al, 0.8-1.2% Ti, 0-0.3% Hf, 2.8-3.2% Re, the rest nickel and unavoidable impurities, and stress the relief treatment is carried out at a temperature of about 950° C. for 1 to 4 hours and at about 1050° C. for 2 to 20 hours.

3. The method according to claim 1, wherein the γ' solvus temperature is determined by performing Differential Thermal Analysis measurements on the service-exposed and degraded alloy and observing the temperature of the onset of γ' solutioning and the γ' solvus temperature.

4. The method according to claim 1, wherein the heat treatment is applied to an article made at least in part with a material which is essentially composed of, in weight percent, 9.3-10% Co, 6.4-6.8% Cr, 0.5-0.7% Mo, 6.2-6.6% W, 6.3-6.7% Ta, 5.45-5.75% Al, 0.8-1.2% Ti, 0-0.3% Hf, 2.8-3.2% Re, the rest nickel and unavoidable impurities, the γ' rejuvenation heat treatment is carried out at a temperature between 1220° C. to 1270° C. for 2 to 12 hours.

5. The method according to claim 4, wherein the γ' rejuvenation treatment is carried out at a temperature between 1220° C. and 1250° C. for 2 to 12 hours.

6. The method according to claim 1, wherein recrystallized areas are detected after the γ' rejuvenation heat treatment and the recrystallized material is replaced by welding or insert brazing a replacement coupon.

7. The method according to claim 6, wherein the replacement coupon is welded epitaxially with base material.

8. The method according to claim 7, wherein the replacement coupon material to be brazed is of a single crystal or directionally solidified structure similar to the base material and the brazing solidifies epitaxially with the coupon and base material.

9. A method of heat treating a nickel-based superalloy comprising a γ' phase, a γ' solvus temperature, and a degraded and rafted microstructure, the method comprising:
   (i) determining the γ' solvus temperature of the superalloy;
   (ii) treating the superalloy at 850° C.-1100° C.
   (iii) treating the superalloy at 20° C.-80° C. below the γ' solvus temperature;
   (iv) treating the superalloy at 1050° C.-1150° C.; and
   (v) treating the superalloy at 800° C.-980° C.

10. The method of claim 9, wherein (iii) is performed at about 1220° C.-1270° C. for 2-12 hours.

11. The method of claim 9, wherein (i) is performed using differential thermal analysis.

12. The method of claim 9, wherein (ii) is performed for 3-24 hours.

13. The method of claim 12, wherein (ii) is performed at about 950° C. for 1-4 hours, and at 1050° C. for 2-20 hours.

* * * * *